United States Patent Office 3,502,593
Patented Mar. 24, 1970

3,502,593
METHOD FOR PREPARING A SMALL PARTICLE SIZE SILICA SOL
Morris Mindick, Clarendon Hills, Ill., assignor to Nalco Chemical Company, Chicago, Ill., a corporation of Delaware
No Drawing. Filed Oct. 18, 1966, Ser. No. 587,435
Int. Cl. C01b 33/14; B01j 13/00; C09j 1/00
U.S. Cl. 252—313                                          1 Claim

ABSTRACT OF THE DISCLOSURE

This invention relates to small particle size silica sols and more particularly to aqueous silica sols containing particles having an average diameter ranging from 5 to 10 millimicrons, wherein said sols have high concentration of silica. The invention further pertains to a method for preparing sols of the above type, in which method alkali metal silicate is added to acid sol in controlled proportions, and water is evaporated under vacuum from the resulting mixture, while sufficient additional acid sol is added to maintain constant volume.

---

Silica sols of small particle diameter are very desirable in certain applications. For example, small particle size silica sols are used in the treatment of rugs to prevent soiling, and have also been found to be highly suitable bonding agents for refractory manufacture. One particular class of silica sols having small particle diameters has become accepted by the silica industry and is described in the Alexander U.S. Patent 2,750,345. These small particle silica sols are characteried by having substantially no salts and have a concentration ranging up to 20–25% or thereabouts.

However, the Alexander type small particle sols possess certain disadvantages which have limited the use of this material in various industrial processes. Specifically, the prior art sols are expensive to prepare, since the final processing of these sols require that they be substantially deionized, normally by ion exchange technique, and thereafter adjusted in salt content by the further addition of such materials as sodium hydroxide. In addition, the maximum permissible concentration of these prior art sols is relatively low, necessitating the shipment of uneconomically large quantities of water to the ultimate consumer. For example, the above cited patent describes an upper concentration limit of 12,000/A where A ranges from 350 to 600. A, in the formula, corresponds to the specific surface area of the sol particles. Accordingly, a 5 millimicron particle diameter sol has a maximum concentration limit of approximately 20% by weight since the value of A for these sols is approximately 600.

A great advance in the silica sol art would be realized if small particle silica sols were available at higher concentrations. Also, silica sols which are stable at higher salt concentrations would be equally valuable, since the expensive and time-consuming operational step of salt removal could be avoided.

Accordingly, it is an object of this invention to provide a silica sol having a high concentration and a particle diameter ranging from approximately 5 to 10 millimicrons in diameter.

Another object of this invention is to provide silica sols having a measurable salt concentration.

A specific object of this invention is to provide a process for making small particle size silica sols having high concentration and measurable salt content.

Other objects will appear hereinafter.

In accordance with the invention, it has now been discovered that silica sols containing discrete dense amorphous particles of silica may be prepared having a particle diameter ranging from 5 to 10 millimicrons. These silica sol contain silica present in an amount ranging from $5+3D$ weight percent to $15+3D$ weight percent, where D is the particle diameter of the silica. In addition, the salt content of these sols range from 0.05% to 0.15% by weight.

Also, in accordance with the invention, a method for preparing silica sols as described herein has been discovered. This method comprises the addition of an amount of alkali metal silicate to a quantity of acid sol having a concentration of about 4% to about 8% by weight silica, as $SiO_2$, to form a mixture thereof. The ratio of silica to alkali metal, calculated as $SiO_2$, in the final product should equal $(10\pm6)D$, wherein D is the particle diameter of the silica ranging from about 5 to about 10. Accordingly, the proportions of the above two components should be adjusted to insure that the final ratio falls within this range. Once this mixture is formed, water is evaporated from the mixture under a vacuum ranging from about 10 to about 25 inches of mercury while simultaneously adding sufficient acid sol to maintain constant volume. This procedure is carried out until a concentration of silica is formed ranging from $5+3D$ to $15+3D$ weight percent, where D again ranges from 5 to 10.

As stated above, the silica sols of this invention have a particle diameter ranging from 5 to 10 millimicrons, and have a salt content of 0.05% to 0.15%. Depending upon the particle diameter, the concentration will vary within the stated range according to the formula above. For example, if the particle diameter is 5 millimicrons, the concentration will range from 20% by weight to 30% by weight. Similarly, if the particle diameter is 10 millimicrons, the concentration of silica sol in the aqueous solution will range from 35% to 45% by weight, calculated as $SiO_2$. Thus, it can be seen that small particle size silica sols are now available which contain considerably higher concentrations of silica sol than has been heretofore possible in the prior art. Specifically, the Alexander patent referred to hereinabove states that the concentration of silica sols having 5 millimicron particle diameters ranges from 15 to a high of only 20%. The 5 millimicron silica sols of this invention, in contrast, have a concentration ranging from 20% to 30%. This higher concentration of silica results in substantial savings to ultimate consumers, due to the reduction in water which is being shipped. Of course, the sols of this invention may be diluted to any lower concentration for ultimate use. In addition, the amount of salt present in the instant sols does not impair stability, in contrast with the sols of the Alexander patent which are unstable in the presence of measurable amounts of salt.

The process of this invention is admirably suited for use in preparing the silica sols of this invention. This first step in the instant process comprises the addition of an amount of alkali metal silicate to a quantity of acid sol having a concentration of 4% to 8% by weight silica. The proportions of these materials should be sufficient to yield a silica to alkali metal ratio of $(10+6)D$, where D ranges from 5 to 10 in the final product. Next, water is evaporated from this mixture under vacuum ranging from 10 to 25 inches of mercury while simultaneously adding sufficient acid sol to maintain a constant volume of this mixture. The mixture is evaporated according to this procedure until the concentration reaches the range set forth above of $5+3D$ to $15+3D$, where D is from 5 to 10.

The alkali metal silicate employed in the process of this invention is the conventional material employed in all of the silica sol art. An especially preferred source of alkali metal silicate is sodium silicate or water glass. This material is supplied commercially in concentrations ranging from 25% to 30% by weight. These commercial solutions of sodium silicate, or other alkali metal silicates, may be employed "as is" or may be diluted depending upon the particular nature of the equipment which is employed.

The second component in the starting or initial step of this process is a quantity of acid sol. The term "acid sol" is known in the art and is used to designate silicic acid sols which are fairly dilute and of exceptionally small particle size. The sols may be prepared by neutralizing sodium silicate with hydrochloric acid under conditions which reduce the amount of cations and anions present therein. A more preferred method for preparing acid sols is to employed the teachings found in the Bird U.S. Patent 2,244,325. This procedure comprises the step of passing dilute sodium silicate solution through a cation exchange resin in the hydrogen form to yield the silicic acid sol. Modification of silica sols prepared by the Bird process as such is necessary, however, before these sols are suitable for use in the process of this invention. Specifically, the concentration of acid sols prepared by the Bird process is limited to a maximum of approximately 4% by weight silica. These sols are too dilute and their use will not result in silica sols having the properties set forth herein. It has been found that the concentration of silica in the initial acid sol must be approximately 4% to about 8% by weight silica, as $SiO_2$, in order to achieve the sols of this invention. Accordingly, sols prepared according to the Bird process may be concentrated to this concentrated to this concentration range of 4% to 8% for use in the process of this invention. Another more practical means for preparing the initial acid sol is to employ the process taught in U.S. patent application bearing Ser. No. 541,858, filed April 11, 1966. Briefly stated, this method comprises the step of passing the solution of alkali metal silicate containing at least 5% solids through a cation exchange resin in the hydrogen form until the first drop in conductivity of the effluent is noted. By this method, acid sols having the proper concentration may be prepared directly.

In any case, it has been found that the acid sol used as a starting reactant in the process of this invention should have a concentration of silica, as $SiO_2$ ranging from about 4% to about 8%. The acid sol and the alkali metal silicate are then mixed such that the ratio in the finally prepared product of silica present to alkali metal, calculated as $SiO_2/M_2O$, where M is the alkali metal, equals $(10\pm 6)D$, where D ranges from 5 to 10. Then, the mixture is concentrated as set forth above to yield the sols of this invention.

The following examples are presented to illustrate various embodiments of the invention.

EXAMPLE I

In this experiment, 100 gallons of acid sol (5% $SiO_2$) was charged to an evaporating tank. With adequate mixing, 7.2 gallons of sodium silicate (28.5% $SiO_2$) was added to the evaporator. The proportions of these materials are such that the final product will have a ratio of silica to alkali of about 50:1. Next, a vacuum was applied and the mixture was heated to boiling. In this case, 15 inches of mercury vacuum was applied. Evaporation was continued at a rate of approximately 100 to 120 gallons per hour while simultaneously adding additional acid sol until the concentration of $SiO_2$ reached 30%. The finished product had a particle diameter of about 8 millimicrons, at a concentration of 30% by weight silica. The salt content was approximately 0.075% by weight.

EXAMPLE II

An experiment similar to Example I was carried out. In this case, 100 gallons of an acid sol having a concentration of 6.5% $SiO_2$ was charged to an evaporator apparatus. 6.6 gallons of alkali metal silicate having a concentration of 28.5% $SiO_2$ was added with mixing. The final product will have a ratio of silica to alkali metal of 35:1 when these proportions are used. At this point, 23.5 inches of mercury vacuum was applied and the mixture was heated to boil. Approximately 30 to 40 gallons per hour of water were evaporated, with additional acid sol being added to maintain constant volume. The process was halted when the concentation of silica reached 25% $SiO_2$. The particle diameter of the resulting sol was 5 millimicrons and the salt content was 0.0625% by weight.

What is claimed is:

1. A method for preparing an equeous silica sol containing discrete dense amorphous particles of silica having a particle diameter ranging from 5 to 10 millimicrons, said silica being present in an amount ranging from $5+3D$ weight percent to $15+3D$ weight percent, where D is said particle diameter, said sol having a salt content ranging from 0.05% to 0.15% by weight, which comprises adding an amount of alkali metal silicate to a quantity of acid sol having a concentration of 4% to 8% by weight silica, as $SiO_2$, in such proportions so that the final silica sol will have a ratio of silica to alkali metal, calculated as $SiO_2/M_2O$, equalling $(10\pm 6)D$, where D ranges from 5 to 10, thereby forming a mixture thereof, and evaporating water from said mixture under a vacuum ranging from 10 to 25 inches of mercury while simultaneously adding sufficietnt additional acid sol to maintain constant volume of said mixture for sufficient time to form a concentration of silica ranging from $5+3D$ to $15+3D$ weight percent, where D again ranges from 5 to 10.

References Cited

UNITED STATES PATENTS 2,750,345   6/1956   Alexander _____ 252—313
2,833,724   5/1958   Alexander et al. ____ 252—313

RICHARD D. LOVERING, Primary Examiner